Feb. 26, 1935.  A. B. PLUSHKELL  1,992,542
PRINTING PRESS
Filed Nov. 7, 1932  6 Sheets-Sheet 2
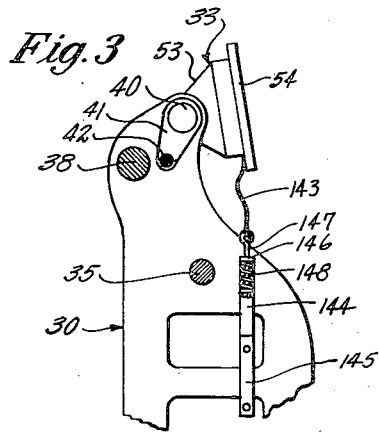
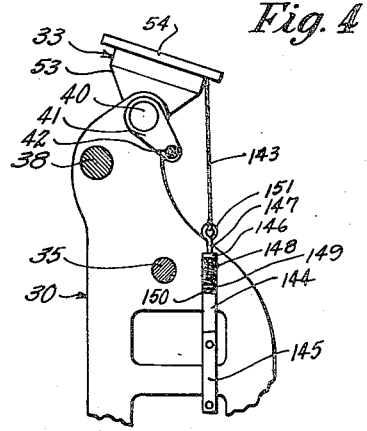
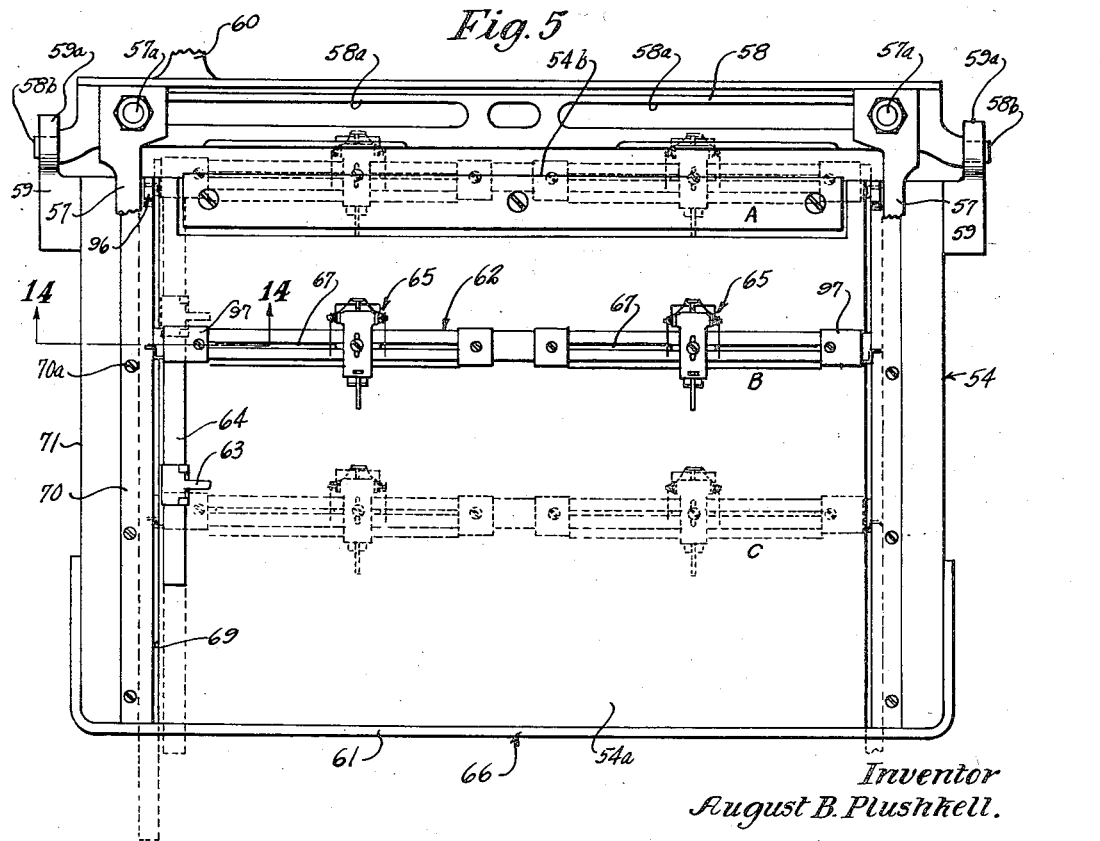
Inventor
August B. Plushkell.
Attorney.

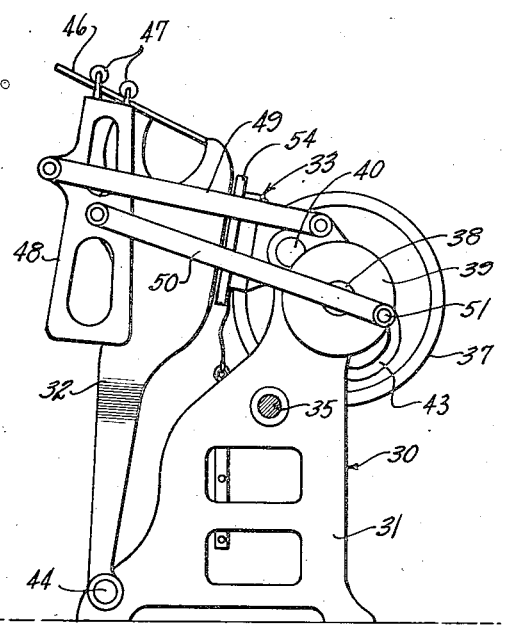
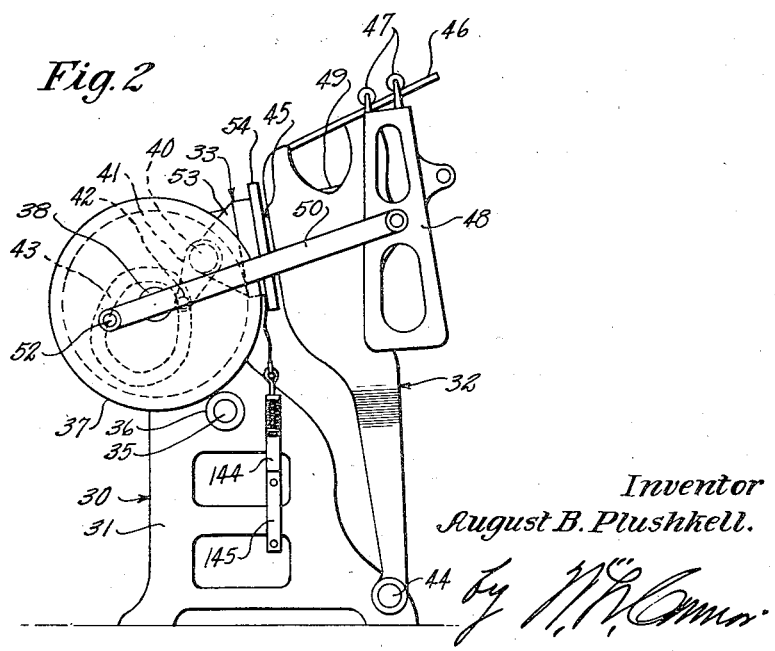

Feb. 26, 1935.  A. B. PLUSHKELL  1,992,542
PRINTING PRESS
Filed Nov. 7, 1932  6 Sheets-Sheet 3

Inventor
August B. Plushkell.

by M. Omer
Attorney.

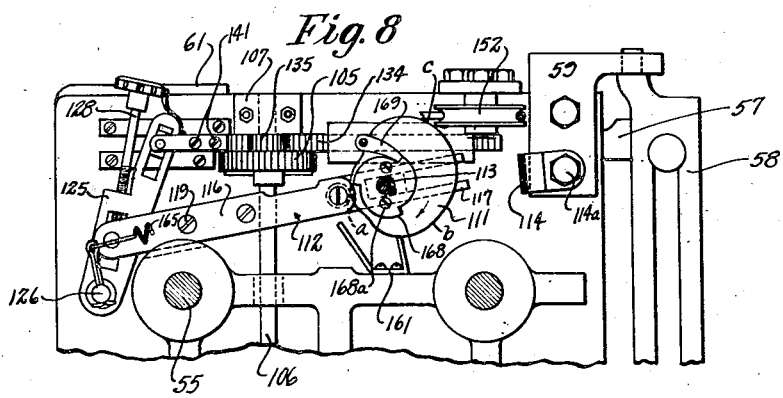
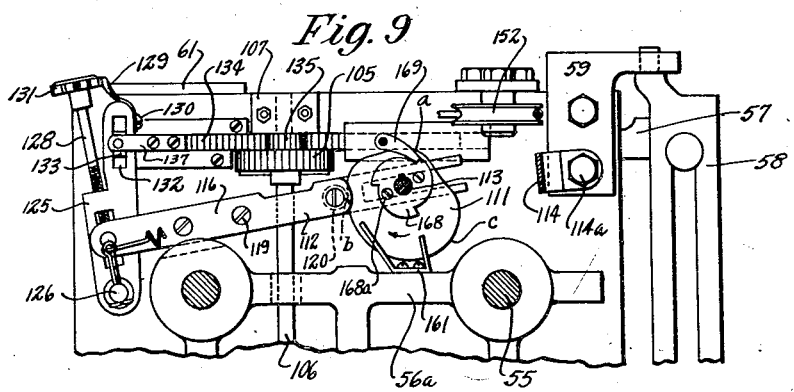
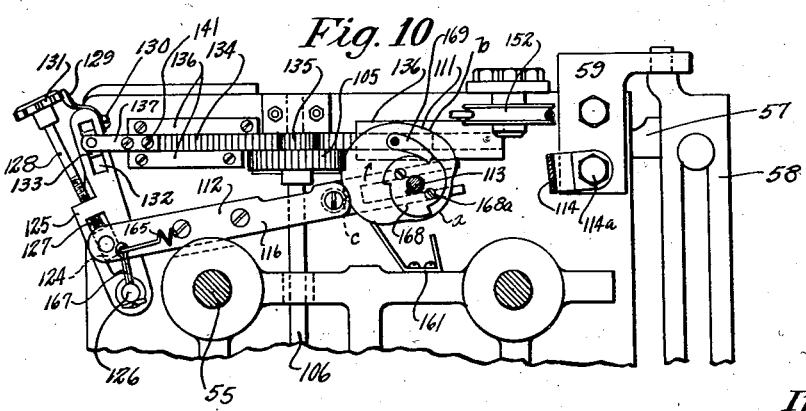

Feb. 26, 1935.  A. B. PLUSHKELL  1,992,542
PRINTING PRESS
Filed Nov. 7, 1932   6 Sheets-Sheet 5
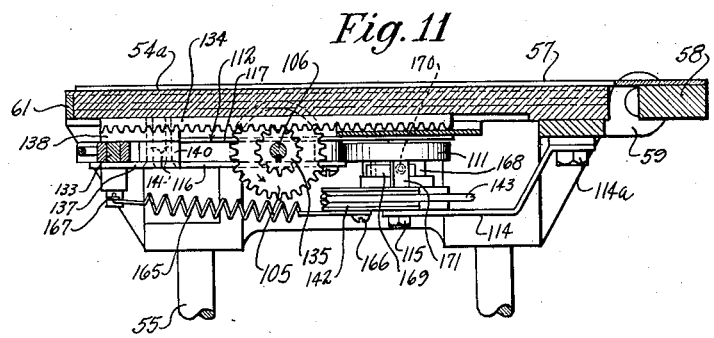
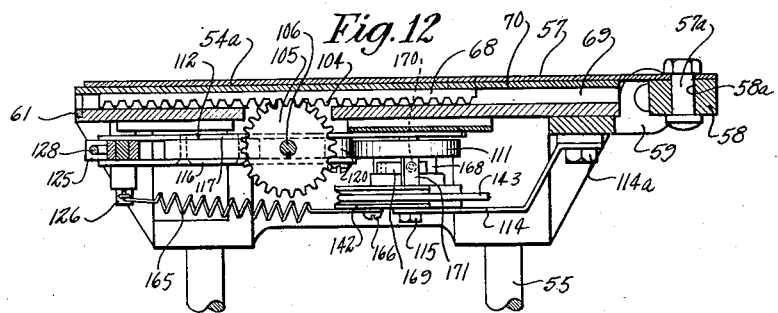
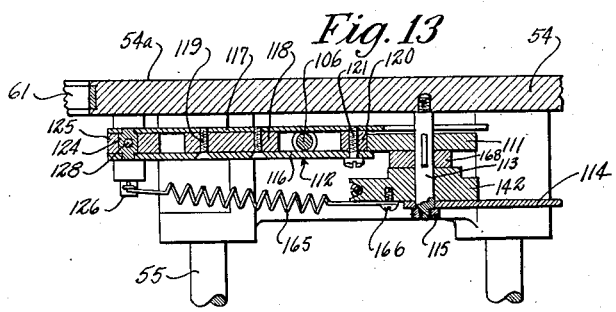
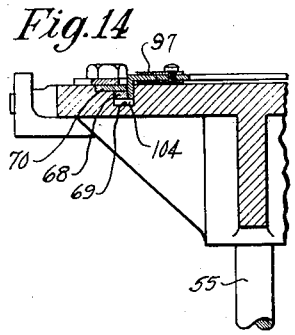
*Inventor*
*August B. Plushkell.*
*Attorney.*

Feb. 26, 1935.  A. B. PLUSHKELL  1,992,542
PRINTING PRESS
Filed Nov. 7, 1932  6 Sheets-Sheet 6
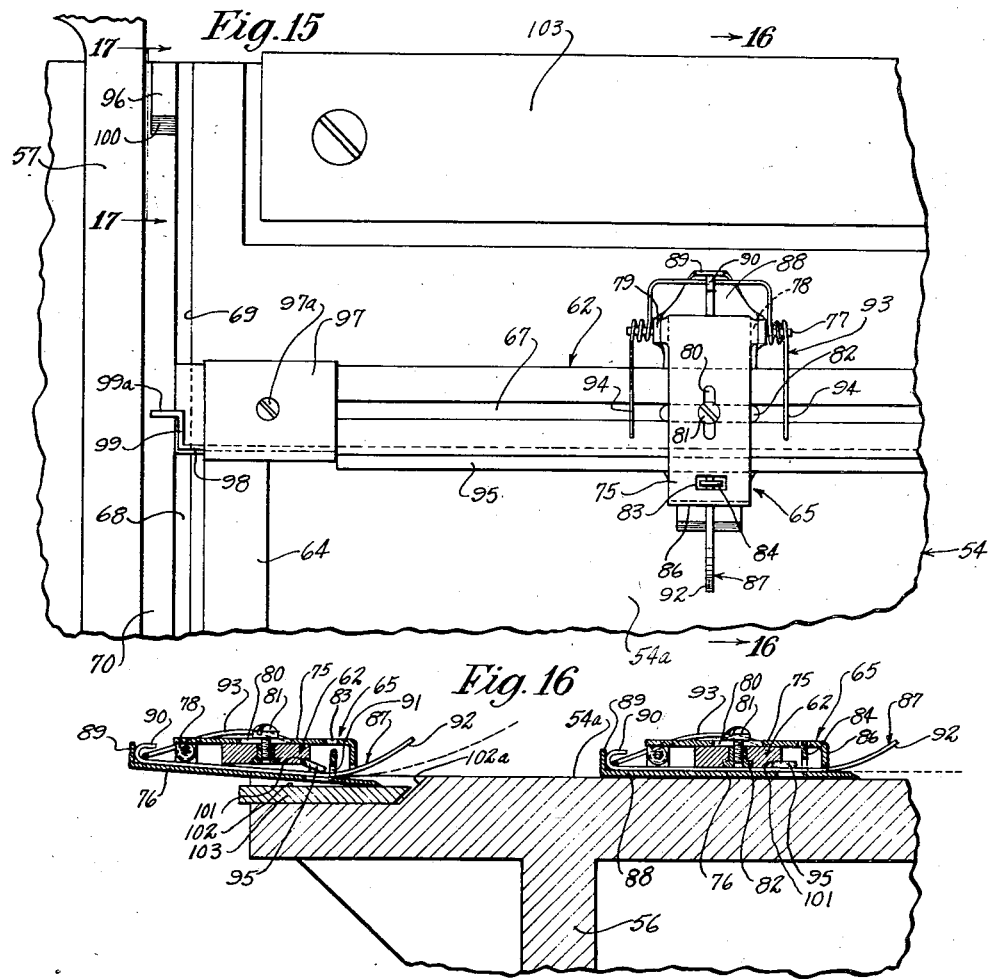
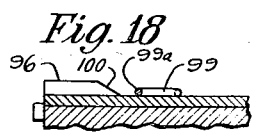
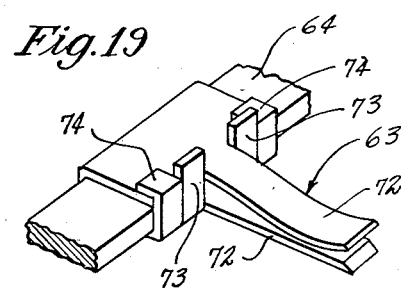
Inventor
August B. Plushkell.
Attorney.

Patented Feb. 26, 1935

1,992,542

UNITED STATES PATENT OFFICE 1,992,542

PRINTING PRESS

August B. Plushkell, Los Angeles, Calif.

Application November 7, 1932, Serial No. 641,538

22 Claims. (Cl. 101—287)

My invention relates to printing presses, especially printing presses of the platen type, and refers particularly to a printing press constructed to automatically impress a form against a sheet of stock at spaced areas in succession.

Broadly described, my invention comprises a stock-retainer movably mounted on the platen, and means operated by the press to shift the stock-retainer along the platen predetermined distances in timed sequence with the impression movements of the press.

It is one object of my invention to provide a substantially self-contained mechanism for such a purpose that may be incorporated in a standard platen press without interfering with the usual printing operation of the press. I thus provide a dual-purpose printing press, a salient feature of the construction being that practically no time or labor is required to change from an ordinary printing operation to one using the accessory mechanism I provide, or vice versa.

My mechanism causes the stock-retainer to traverse the platen by intermittent predetermined movements, in repeating cycles, and is readily adjustable to alter the extent of the individual shifts, and, thereby, the spacing of the multiple impressions.

In my invention, preferably, the stock-retainer automatically clamps a sheet of stock at one position in the cycle and releases the sheet upon completing the cycle, the press requiring no attention on the part of the operator during the cycle.

My invention is particularly applicable to a platen press, and, for the purpose of illustration, will be specifically described as so applied, but the improvement may be incorporated in other types of machines, no limitation being implied by my description.

My invention is distinguished by the economy it effects in saving press set-ups and handling of the stock. For example, it is ordinarily more economical to run a hundred sheets of stock through a printing operation, making three impressions per sheet by utilizing my mechanism, and then to shear the stock into three hundred pieces of printing matter, than it is to first shear the stock into three hundred pieces to be printed in the usual manner. The uniformity of results obtained by my invention makes such a choice possible.

An operation which illustrates to advantage the value of such a procedure is the printing of names of bank depositors on blank checks. Three checks, separated by perforations, make up a page of a commercial check book. Inasmuch as this printing service is usually given free of charge to the bank's customers, the cost of the operation is important.

In common practice, the printer has the choice of setting up three spaced forms of type simultaneously, or the alternative of handling the stock three times for three runs with a single form, the position of the form being changed between runs. Because the cost of setting type constitutes an inordinately large proportion of the cost of printing, the latter choice is usually made. My invention offering a third choice eliminates two of the three runs, and, of course, the necessity of adjusting the form or feed guides more than once.

It is conceivable that a printing press may be built for the particular printing operation required in printing three checks with one form and one handling, either by providing for shifting the form from one check to another, or for shifting the pages of checks relatively to the fixed form; but this class of work is generally handled by small printing shops, and is not of sufficient volume to justify investing in a special printing press. The adaptability of my invention to the usual equipment employed in printing shops is, therefore, an important feature.

Other objects and advantages of my invention will be apparent in the following detailed description, considered with the drawings, in which:

Fig. 1 is a side elevation of a platen press incorporating my invention;

Fig. 2 is a similar elevation taken from the opposite side of the press;

Fig. 3 is a fragmentary view of the press showing the flexible operating connection between the platen and the frame;

Fig. 4 is similar to Fig. 3 with the platen in a second position;

Fig. 5 is an enlarged top plan view, partly broken, of the platen equipped with my invention;

Fig. 8 is a fragmentary bottom view of the platen, showing the mechanism in one position;

Fig. 9 is a view similar to Fig. 8, showing the mechanism in a second position;

Fig. 10 is a similar view of a third position;

Fig. 11 is a section of the platen, taken as indicated by the line 11—11 of Fig. 6;

Fig. 12 is a similar section, taken as indicated by the line 12—12 of Fig. 6;

Fig. 13 is a further enlarged fragmentary section of the platen, taken as indicated by the line 13—13 of Fig. 6;

Fig. 14 is a fragmentary sectional view of the platen, taken as indicated by the line 14—14 of Fig. 5;

Fig. 15 is a fragmentary top view of the platen enlarged to show the construction of the stock-retainer;

Fig. 16 is a fragmentary section, taken as indicated by the line 16—16 of Fig. 15, and is also enlarged to show details of an element in the stock-retainer, the same element being shown in two different positions;

Fig. 17 is a fragmentary section, taken as indicated by the line 17—17 of Fig. 15, showing a control element of the stock-retainer in one position;

Fig. 18 is a similar view, showing the control element in a second position; and Fig. 19 is a diagrammatic view of the guide clip.

Figure 6:
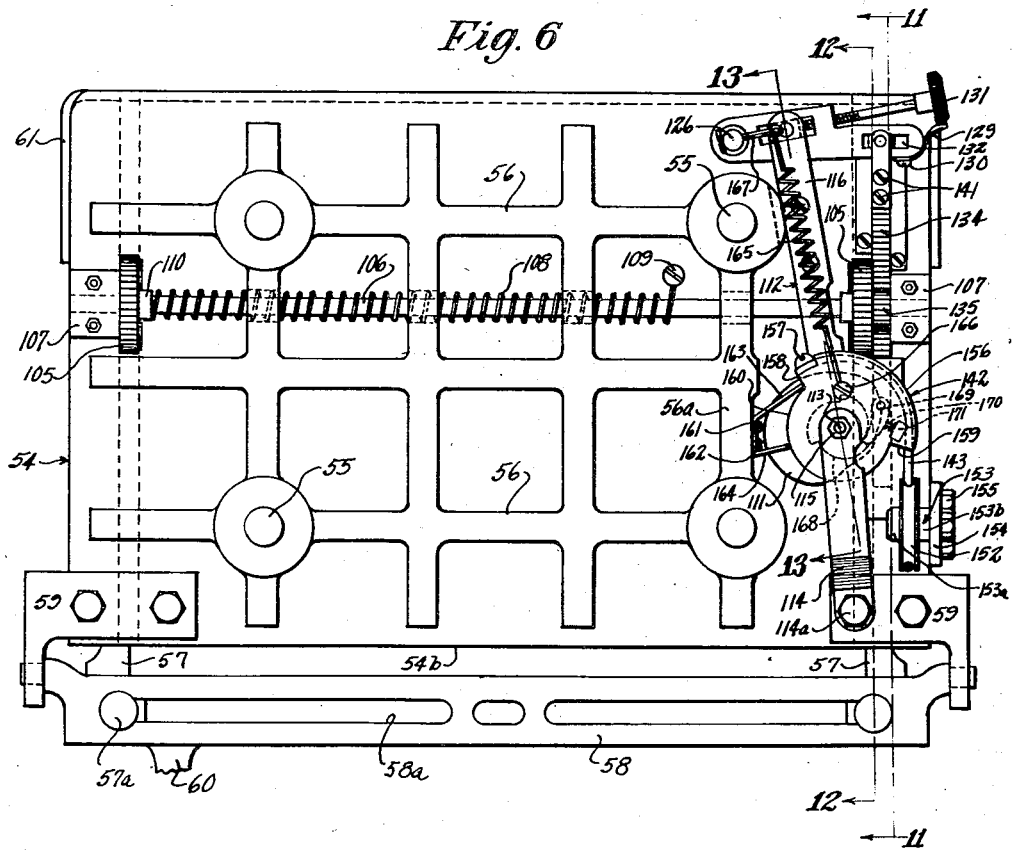
Fig. 6 is a bottom view of the platen on the same scale as Fig. 5.

The platen press shown in Figs. 1 and 2 is of a well-known type. The frame, generally designated 30, includes two side members 31, and pivotally carries a form bed 32 and a platen 33. A drive shaft 35 carries a spur gear 36 which meshes with teeth in the periphery of fly-wheel 37. Flywheel 37 is keyed to one end of shaft 38 and a smaller wheel 39 is keyed to the other end of the shaft. Platen assembly, generally designated by the numeral 33, pivotally reciprocates on its trunnions 40, which are suitably journaled in frame members 31; and the assembly being actuated by a control arm 41 carrying follower 42, which engages in a cam slot 43 on the inner face of fly-wheel 37. Form bed 32 oscillates towards and away from the platen 33, on shaft 44, by virtue of operative connections (not shown), these movements being synchronized, in the usual manner, with the rocking movements of platen assembly 33 so the two go through a cycle of movements, including the impression movement of platen 33, against which the type carried in a form on face 45 of the form bed moves.

At the top of form bed 32 is the usual ink disk 46. The usual, yieldingly mounted, ink rollers 47 move over ink disk 46 and traverse the type on face 45 of the case frame during intervals between the impression movements of the platen and form bed. This movement of the rollers is effected by virtue of a frame 48 depending from the rollers, a link 49 pivotally connected at its end to frame 48 and press frame 30, and a pair of crank arms 50, one of which is pivoted to frame 48 and to wrist pin 51 in wheel 39, and the other of which is likewise pivoted to frame 48 and to a wrist pin 52 in fly-wheel 37.

The platen assembly 33 is composed of a supporting base 53 upon which my improved platen 54 is removably mounted, by means of studs 55 formed integral with supporting ribs 56. The platen support 53 is of the usual type commonly found in standard printing presses.

Extending across the face 54a of the platen 54, adjacent the side edges, are the usual stock gripper bars 57; these being carried by a bar 58 extending across the inner or lower transverse edge of the platen. Bars 57 are laterally adjustably mounted upon bar 58 by means of bolts 57a extending through slots 58a. Bar 58 has studs 58b at its ends, by which it is pivotally supported between ears 59a of brackets 59, so that gripper bars 57 may be successively raised and lowered, relative to the face 54a of the platen, as the latter is reciprocally tilted from the position shown in Fig. 4 to that shown in Fig. 3 and vice versa. Bar 58 may be tilted in any of the well-known manners, such as by an arm 60 engaging a suitable member on frame 30.

As means of securing the tympan to the platen, a pivoted U-shaped bail 61 is usually mounted adjacent the edge of the platen plate, as shown.

The elements listed to this point are well known as parts of platen presses now in extensive use and form no part of my invention.

In my invention, means is required to hold a sheet of stock on the platen and to move it from one position to another across the platen. This means, which may be referred to generally as the stock retainer, may comprise a vertically movable laterally extending carrier 62, spaced from face 54a of the platen, a stock guide clip 63, attached to carrier 62 by a forwardly extending arm 64, and one or more stock clamps 65 adjustably carried by the carrier 62. In this particular construction, guide clip 63 engages a sheet of stock with a relatively light grip and serves as a lateral stop in feeding the press, while stock clamps 65 engage the sheet of stock with a more positive grip and serve as guides for the sheets relative to the forward edge 66 of the platen.

Carrier 62, in the case of two stock clamps, as shown in Fig. 5 (sheet 2), has two spaced longitudinal slots 67. The two ends of bar 62 turn down for rigid attachment to a pair of slides 68. These slides are mounted to reciprocate longitudinally in channels 69 cut in the face 54a of the platen near to, and parallel with, the side edges of the platen, and are retained in channels 69 by cleats 70, which overlap the channel flush with the face 54a of the platen. (See Fig. 14—sheet 5). Arm 64 is suitably attached to the under side of carrier bar 62 and extends forwardly parallel with the side edge 71 of the platen.

The construction of guide clip 63 may be understood by reference to Fig. 19 on sheet 6. It consists of a small piece of light spring metal folded to form two layers embracing bar 64. Two co-acting tongues 72, one from each layer, extend out laterally over the face of the platen and press together. These are flanked by vertical tongues 73 extending from the lower layer, and at each end of the clip a tongue 74 integral with the bottom layer is clinched over the edge of the top layer. A sheet of stock pressed against clip 63 from the opposite side of the platen becomes engaged between tongues 72, being stopped by vertical tongues 73. The tympan may extend between the tongues 72, if desired, so that a sheet of stock becomes gripped between the tympan and the upper tongue.

The construction of my preferred form of stock clamp is revealed in Figs. 15 and 16 (sheet 6). Each clamp has an upper jaw 75 and a lower jaw 76, which are hinged together by a pintle 77 extending through ears 78 of the upper jaw and complementary ears 79 of the lower jaw. Upper jaw 75 has a longitudinal slot 80, through which a suitable screw 81 extends to engage a keeper 82. This keeper is T-shaped in cross-section to fit snugly within slot 67. By means of screw 81 and keeper 82, clamp 65 may be laterally adjustably secured to carrier 62. Towards its forward end, upper jaw 75 has a lateral slot 83 positioned to receive the end of an upwardly extending tongue 84 integral with the bottom jaw. The forward end of upper jaw 75 terminates in a downwardly extending flange 86 suitably notched on its lower edge to bridge over a spring wire clip 87. Lower jaw 76 has a portion 88 extending rearwardly beyond ears 79 which terminates in an upwardly extending flange 89. Spring wire 87 has a hook 90 formed on its rearward end, which rests on top of jaw 76 against flange 89, and the wire lies along the longitudinal center of lower jaw 75, through an aperture 91 in tongue 84, and extends forward from the two jaws to end in an upwardly turned portion 92. The forward edge of lower jaw 76 extends beyond flange 86 of the upper jaw and is beveled at its forward edge. Stock clamp 65 has an inherent tendency to remain closed by virtue of a U-shaped wire spring 93, which presses downward at its two ends 94 against the top surface of carrier 62, coils about the ends of pintle 77 and presses down at its center, against the rear portion 88 of the lower jaw.

It is apparent that stop clamp 65, comprised of the elements thus far described, may serve as a friction grip for stock sheets and act in the same manner as guide clip 63 heretofore described, but I prefer to have spring 93 strong enough to close the jaws in a positive manner with a relatively powerful grip, and to arrange for the jaws to open automatically at one point in the cycle of the carrier movement in order to release a stock sheet and receive a new stock sheet for the ensuing cycle of movements. To this end, I provide a laterally extending metal pry-bar 95 which is arranged as a control means for the stock clamps, coacting for such purpose with beveled lugs 96 on the face of the platen near the inner or bottom edge, preferably integral with cleat 70. This bar is machined at its ends to form wire-shaped extensions continuous with the rear edge of the bar, which are suitably journaled by spaced sheet metal bands 97. These bands embrace carrier bar 62 and are secured thereto by means of screws 97a extending through slots 67 at each end of the slot. The outer wire portions 98 of the pry-bar are formed in the shape of cranks 99 in the same plane as the bar and the ends 99a of the crank slide along the surface of the platen in a path which carries them up the beveled faces 100 of lugs 96. Pry-bar 95, intermediate its journaled ends, extends through the jaws of stock clamps 65, resting on spring wires 87 back of the tongues 84, and its rear edge extends into a rabbet recess 101 cut in the lower front edge of bar 62.

When cranks 99 are revolved upward by ends 99a riding on lugs 96, pry-bar 95 pivots on its rear edge to pry downwardly on spring wire 87 with sufficient force to overcome the action of spring 93, thus forcing the jaws apart. The parts of stock clamp 65 are so inter-related that when pry bar 95 turns downwardly it presses wire 87 against an aperture 84a left by tongue 84 in the lower jaw. This action causes the wire to fulcrum in aperture 91 of tongue 84 so that the forward end 92 of the wire is sprung upwards to release a sheet of stock. Preferably face 54a of the platen is cut away adjacent its rear edge to form an offset planer surface 102 which is faced with a suitable plate 103. The purpose of this depression in the face of the platen, which has a forward beveled edge 102a, is twofold: first, to provide room for the lower jaw to drop away from the upper jaw when pry-bar 95 is turned by lugs 96, and, second, to drop the center of the opening of the jaws into the plane of platen face 54a.

By virtue of the construction described, a stock clamp 65 automatically opens whenever carrier 62 is at the rear edge of the platen, and when the carrier is in any other position on the platen stock clamp 65 is tightly closed.

The two spaced, sliding support members 68 of the stock-retainer are in the form of rack bars having teeth 104 presented downward for engagement by spaced gears 105, the latter extending through the bottom of the platen plate, into channel 69, as shown in Fig. 12 (sheet 5). These two gears are keyed to the same shaft, 106, which journals in two bearing blocks 107 secured to the under side of platen 54. Gears 105 serve not only to move the two racks 68 longitudinally, but also to keep them in constant alignment with each other. I prefer to provide a power means for driving gears 105 in one direction against the action of a yielding means which reverses the direction of movement, the power movement causing carrier 62 to move intermittently across platen face 54a from the inner or bottom edge 54b towards the outer or top edge 66, and the yielding means causing the return of the carrier to edge 54b, in one continuous movement. For such a yielding means, I provide a coiled spring 108 surrounding shaft 106, secured at one end to the bottom of the platen 54 by a suitable screw 109, and suitably secured at its opposite end to hub 110 of one of the gears 105.

This cycle of movements may be caused by and be governed by a rotary control, such as cam 111 coacting with a slide arm 112 (see Figs. 8, 9 and 10—sheet 4). Cam 111 is formed with three dwells, $a$, $b$ and $c$, 120° apart, with smooth transitions in between, the range between inner dwell $a$ and intermediate dwell $b$ in radial distance from the center of rotation being equal to the range between dwell $b$ and outer dwell $c$. Cam 111 is free to rotate on stud shaft 113, which is screwed into the bottom of the platen 54, in perpendicular alignment thereto and is held at its lower outer end by a brace 114. Brace 114 is secured to the under side of the platen 54 by means of a cap screw 114a and is apertured at its opposite end to receive shaft 113, to which it is secured by a nut 115.

Slide arm 112 comprises two parallel straps—a shorter strap 116 and a longer strap 117—which are assembled to an intermediate spacer 118 by means of suitable screws 119. A non-friction roller 120, revolubly secured between the two straps by screw 121, serves as a follower continuously abutting the periphery of cam 111 and is kept in continuous alignment by virtue of the fact that both straps 116 and 117 extend inside the periphery of the cam. The longer arm 117 is bifurcated to be guided by shaft 113 and is of sufficient length to be in continuous engagement with that shaft. Slide arm 112 is also guided by shaft 106, which extends between the two straps 116 and 117 between spacer 118 and roller 120. At the outer end of slide arm 112, the two straps are suitably apertured to serve as journals for a pivot block 124 carried by lever 125. Lever 125 is pivoted to a suitable stud shaft 126 which is fixed perpendicularly to the bottom of the platen 54. Pivot block 124 slides longitudinally of lever 125 in a suitable slot 127 and may be adjustably fixed at any point within this slot by means of a thumb-screw 128. Thumb-screw 128 is rotatably connected to the pivot block and screw-threadedly carried by lever 125. It is ordinarily secured against rotation by a suitable spring-wire latch 129 which is attached at one end by screw 130 to lever 125, and presses with its free end against the serrated periphery of the thumb-screw head 131. The outer portion of lever 125 is provided with a longitudinal slot 132, in which a pivot block 133 is slidingly mounted to reciprocate. Pivot block 133 is operatively connected with a longitudinally movable rack 134, which rests upon, and engages with, a spur gear 135, the rack being confined between the spur gear and the bottom surface of the platen. Rack 134 is guided longitudinally by four guide cleats 136. Pivot block 133 is journaled in a lower strap 137 and an upper strap 138, which are separated by spacer 140. Two screws 141 extend through the two straps and spacer into rack 134, so that they become, in effect, integral with rack 134, strap 138 being formed with its upper edge conforming to the teeth of the rack. Spur gear 135 is keyed to shaft 106 and is of smaller diameter than gears 105, which are also keyed to the shaft, as previously noted.

It is apparent that slide arm 112 and lever 125 constitute a connecting linkage that provides means for adjusting the extent to which the stock-retainer is moved along the face of the platen by the action of cam 111. It will also be recognized that racks 68 and 134, as connected by intervening gears 105 and 135, serve as means for multiplying the movements of the parts imparted by cam 111, the extent of such multiplication being determined by the ratio of the diameter of spur gear 135 to gear 105.

If cam 111 is rotated in the direction indicated by the arrows in Figs. 8, 9 and 10, starting with follower 120 at dwell $a$ on the cam (Fig. 8), one-third of a revolution bringing dwell $b$ into contact with follower 120 (Fig. 9), will move lever 125 outward, shifting rack 134 a corresponding amount. This movement of rack 134 rotates spur gear 135 counterclockwise (see Fig. 11) and gear 105, moved thereby in the same direction, also moves rack 68 outward in a forward direction with respect to the platen (see Fig. 12). This movement of rack 68 shifts carrier 62 from position A to position B (see Fig. 5—sheet 2). At the beginning of this movement the jaws of stock clamp 65 are closed as heretofore described.

When another 120° of rotation places cam 111 in the position indicated in Fig. 10 (sheet 4) with dwell $c$ in contact with follower 120, the outward movement above described is continued, shifting carrier 62 from position B to position C. Both of these movements are made against the action of spring 108, which tends to turn shaft 106 in the opposite direction, thereby serving at all times to press follower 120 against cam 111. In the next 120° of angular movement completing one revolution, dwell $a$ is again brought to the position shown in Fig. 8 and spring 108 immediately reverses the two forward movements just described, thereby returning carrier 62 to position A. In this return movement, obviously the carrier moves twice as fast as in either of the forward movements. When the carrier is returned to position A the stock clamp 65 automatically opens, as previously described.

Instead of rotating cam 111 continuously at a rate to synchronize the dwells with the impression movement of the press, I prefer to move it intermittently 120° at a time, each movement coming between the impression movements of the press. The necessary synchronized power connection with the press may include an alternating or oscillating driver 142 actuated by a cable 143 that interconnects the alternating driver and the frame of the press. A bracket 144 is secured to one of frame members 31 by means of a U-shaped strap 145. The upper end of the bracket has an inwardly turned flanged portion 146, which is apertured to slidingly receive an eye-bolt 147. A coiled spring 148 surrounding the lower end of eye-bolt 147 is confined between flange 146 and a washer 149 secured to the lower end of the eye-bolt by a nut 150. One end of cable 143 is secured to the eye 151 of this bolt. Driver 142 is mounted to rotate freely on shaft 113.

Figure 7:
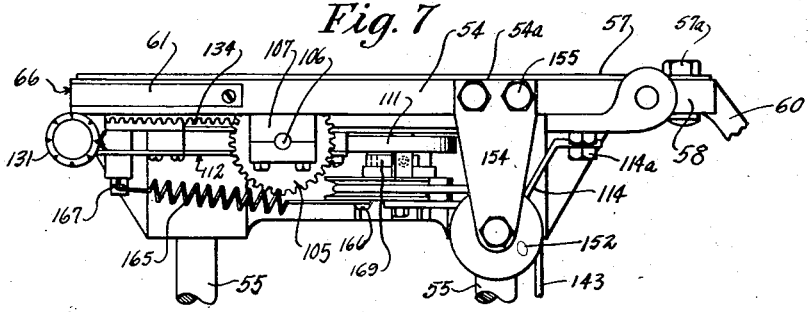
Fig. 7 is a side elevation of the platen.

Cable 143 extending upward from brackets 144 turns through a 90° change of direction around a guide pulley 152 (see Figs. 6 and 7 on sheet 3), which is mounted on a suitable stud 153. Stud 153 is carried by a depending bracket 154, which is secured to the side of the platen by suitable bolts 155. Pulley 152 rotates on a reduced portion of the stud between the head 153$a$ of the stud and a spacing ring 153$b$.

Driver 142 is of irregular shape, having two portions of its periphery corresponding to arcs swung on two different radii from the axis of shaft 113. The outer portion 156, corresponding to the longer radius, is formed with a peripheral groove to receive cable 143, one end of the groove being provided with a screw 157 for securing the cable. At the ends of portion 156 are shoulders 158 and 159, respectively, between which there is the portion of the periphery 160 having the smaller radius. A clip 161 is secured by screws 162 to a rib 56$a$ of the platen, so that one arm 163 acts as a stop for shoulder 158 and the other arm 164 acts as a stop for shoulder 169. The rotary movement of driver 142 is thereby limited to approximately 135°. Opposed to the pull of cable 143 on driver 142 is a helical contractile spring 165, which at one end is connected to the side of driver 142 by means of a screw 166, and, at the other end, is secured to the platen at a convenient point as by a cotter-pin 167 on the end of stud shaft 126. The cable 143 is of such a length and the elements described are so related that when the platen moves against the form bed (see Fig. 3) cable 143 is slack and spring 165 rotates driver 142 to the position where shoulder 158 abuts stop 163; and when the platen moves forward to the opposite limit of its oscillation (see Fig. 4) cable 143 rotates driver 142 against the action of spring 165 to a position where shoulder 159 abuts stop 162. Spring 148 serves as a buffer to prevent cable 143 being pulled so tight as to injure the mechanism and arm 164 may be designed to be slightly yielding for the same purpose.

The operative connection between driver 142 and cam 111 may be in the form of a pawl and ratchet mechanism. A ratchet wheel 168, having three peripheral teeth spaced 120° apart, is mounted on shaft 113 between driver 143 and cam 111. This ratchet wheel is suitably attached to the cam 111 as by screws 168$a$. A pawl 169, pivoted to the side of driver 142 in the same plane as ratchet wheel 168, is positioned to engage the periphery of the ratchet wheel, and is continuously pressed into engagement with the ratchet wheel by a suitable helical expansile spring 170. This spring extends from a lug 171 integral with driver 142. The positions of the driver, pawl, ratchet wheel, and cam are so related that when the cable is drawn taut, to move shoulder 159 against stop 164, as shown in Fig. 4, the pawl engages a ratchet tooth and moves the ratchet and cam 120° so that one of the dwells $a$, $b$ or $c$ on cam 111 registers with follower 120. When the driver makes the return movement to place shoulder 158 against stop 163, the pawl, now disengaged from the ratchet, is carried more than 120°, to catch a new tooth in the ratchet. By this arrangement, the cam is rotated 120° on the return movement of the platen from the position of impression against the form bed and is not affected by the opposite movement of the platen.

The operation of my invention may be understood from the foregoing description. When dwell $a$ of cam 111 is in contact with follower 120, carrier 62 is in position A, stock-clamps 65 are open, and platen 33 is at the forward end of its reciprocation. The printer places a sheet of stock in the jaws of stock-clamps 65, aligning the sheet laterally by pushing its edge into engagement with guide clip 63. Cable 143 is taut, holding shoulder 159 of driver 142 against stop 162. As the platen rocks backward to make the first impression movement in conjunction with the form bed, tension on cable 143 is released, and driver 142 returns to the position shown in Fig. 6 (sheet 3). Since the pawl 169 rides over ratchet wheel 168 on this return movement of the driver, control cam 111 is not actuated. Consequently, carrier 62 remains at position A during the first impression movement of the press, and the uppermost of the three checks is printed. As the platen rocks forward cable 143 is again pulled taut, thereby actuating driver 142, whereupon pawl 169 engages a ratchet tooth and cam 111 is rotated 120° to place dwell $b$ in contact with follower 120. As a result, carrier 62 shifts from position A to position B. In the above described printing operation the stock sheet is held in place by guide clips 63 and the open stock clamps 65, but when the carrier initially moves towards position B, the stock clamps 65 close to secure the paper in a positive manner, as previously described. It has been found that by virtue of the construction shown, it is not necessary to close the stock clamps during the first printing operation. The middle check of the page is printed when the carrier is in position B, after which the carrier is automatically shifted to position C to print the lowermost check. The three checks on a page now having been printed, the platen returns from its third impression movement, and in doing so causes control cam 111 to rotate again to a position where its dwell $a$ is against follower 120. Carrier 62 is returned from position C to position A, but not before the operator has an opportunity to remove the printed sheet. At position A, stock clamps 65 are open, permitting the printer to insert a new sheet for a new cycle of printing operations. During these printing operations one or more rubber bands may be stretched across between the two grippers to prevent the sheet from adhering to the form.

In case the printing press is to be used as a standard machine for ordinary single-impression printing, the operator needs but disengage cable 143 to proceed with the usual printing operation. The cable is disengaged when carrier 62 is in position A, spring 108 having suitable strength to prevent the carrier moving forward from that position. Carrier bar 62 is detachable from rack 68, to permit grippers 67 to be moved inward to handle narrow stock. Cleats 70 may be replaced by plain cleats wide enough to completely cover channel 69; and spacing strip 103 may be elevated by shims to a position flush with face 54a of the platen. By these simple expedients the whole surface of the platen may be converted into a completely uniform, plain surface for printing stock in the usual manner.

The above described mechanism may be widely modified without departing from the essential principles of my invention, and I reserve the right to all such modifications or changes in structure or form that properly come within the scope of the claims appended hereto.

Having described my invention, I claim:

1. In a printing press having a movable platen and a form-bed, the combination of: a stock-retainer movably associated with the platen; mechanism associated with the platen for shifting the stock-retainer relative thereto; and means operated by movements of the platen to actuate said mechanism in timed sequence with the engagement of the platen with the form-bed.

2. In a printing press having a movable platen, the combination of: a stock-retainer movably associated with the platen; mechanism associated with the platen for shifting the stock-retainer relative thereto in cycles of intermittent movements in timed sequence with the impression movements of the platen; and means operated by movements of the platen to actuate said mechanism.

3. In a printing press having a frame and a platen movable relative to the platen, means to shift stock across the platen in intermittent predetermined movements in timed sequence with the impression movements of the press, comprising, in combination: a stock-retainer movably mounted on the platen; mechanism associated with the platen to move the stock-retainer; an alternating driver; a pawl-and-ratchet mechanism operatively connecting the driver with said mechanism whereby movement of the driver in one direction actuates the mechanism; means interconnecting the driver and the frame whereby movement of the platen in one direction moves the driver in one direction; and yielding means associated with the platen to move the driver in the opposite direction.

4. In a printing press having a frame and a movable platen, means to shift stock across the platen in intermittent predetermined movements in timed sequence with the impression movements of the press, comprising, in combination: a stock-retainer; a carrier for the stock-retainer having a base portion movably mounted on the platen; rack-and-gear mechanism associated with the platen operatively connected to the carrier; a cam-means associated with the platen, said rack-and-gear mechanism multiplying the motion transmitted by the cam-means; linkage operatively connecting the cam-means with the rack-and-gear mechanism; an alternating drive member; ratchet-and-pawl mechanism operatively connecting the drive member with the cam-means; and means operated by the press to actuate the drive member.

5. In a printing press having a frame and a movable platen, means to shift stock across the platen in cycles of intermittent movements in timed sequence with the impression movements of the press, comprising, in combination: a stock-retainer; a carrier for the stock-retainer having a base portion movably mounted on the platen; rack-and-gear mechanism associated with the platen operatively connected to the carrier; a cam-means associated with the platen; linkage operatively connecting the cam-means with the rack-and-gear mechanism; an alternating drive member; ratchet-and-pawl mechanism operatively connecting the drive member with the cam-means; and means interconnecting the frame and the drive member whereby movements of the platen actuate said drive member.

6. In a printing press having a platen, means to shift stock across the platen in cycles of intermittent movements in timed sequence with the impression movements of the press, comprising, in combination: a stock-retainer adapted to engage and release stock; a carrier for the stock-retainer having a base portion movably mounted on the platen; rack-and-gear mechanism associated with the platen to move the carrier across the platen; a control means associated with the stock-retainer and the platen adapted to cause the stock-retainer to release and engage stock at one point in the cycle; a cam-means associated with the platen; linkage operatively connecting the cam-means with the rack-and-gear mechanism; an alternating drive member; ratchet-and-pawl mechanism operatively connecting the drive member with the cam-means; and means operated by the press to actuate the drive member.

7. In a printing press having a platen and a form bed relatively movable towards and away from each other, the combination of: a stock-retainer movably associated with the platen; mechanism associated with the platen for shifting the stock-retainer relative thereto; and means operated by said relative movement to actuate said mechanism in timed sequence with the printing engagement of the platen with the form bed.

8. In a printing press having a frame member and a platen member, said members being adapted for relative movement towards and away from each other, the combination of: a stock-retainer movably associated with the platen member; mechanism associated with the platen member for shifting the stock-retainer relative thereto in cycles of intermittent movements in timed sequence with the impression movements of the press; and means interconnecting the frame member and said mechanism whereby said relative movements actuate said mechanism.

9. In a printing press having a frame member and a platen member, said members being adapted for relative movement towards and away from each other, means to shift stock across the platen member in intermittent predetermined movements in timed sequence with the impression movements of the press, comprising, in combination: a stock-retainer movably mounted on the platen member and adapted to automatically release and engage stock; mechanism associated with the platen member to move the stock-retainer; and means interconnecting the frame member and said mechanism whereby said relative movement actuates said mechanism.

10. In a printing press having a platen and another member, the platen and member being relatively movable towards and away from each other, means to shift stock across the platen in intermittent predetermined movements in timed sequence with the impression movements of the press, comprising, in combination: a stock-retainer; a carrier for the stock-retainer having a base portion movably mounted on the platen; rack-and-gear mechanism associated with the platen operatively connected to the carrier; a cam-means associated with the platen; linkage operatively connecting the cam-means with the rack-and-gear mechanism; an alternating drive member; ratchet-and-pawl mechanism operatively connecting the drive member with the cam-means; and means operatively connecting the drive member and said press member whereby said relative movement between the platen and the press member actuates said drive member.

11. A printing press having, in combination: a movable platen; a stock-retainer movably mounted on the platen; and means actuated by movements of the platen to shift the stock-retainer across the platen in one direction through a cycle of printing positions in timed sequence with the printing movements of the press and to reverse the cycle in one movement in timed sequence with the printing movements of the platen.

12. In a printing press having a platen and a form bed carrying type, the combination of: a normally closed stock-retainer movably mounted on the platen; means to shift the stock-retainer from a first printing position intermittently across the platen in one direction through successive printing positions in timed sequence with the printing movements of the press to expose successive areas of a sheet of stock to the type; means to return the closed stock-retainer to said first printing position; and means to open the stock-retainer at said first printing position for removal and feeding of stock, the stock-retainer being closed at all other printing positions.

13. A printing press having, in combination: an alternating platen; a fixed member; a stock-retainer movably mounted on the platen; mechanism associated with the platen to shift the stock-retainer through a cycle of positions on the platen; an alternating driver on the platen operating said mechanism; and means interconnecting the alternating driver and said fixed member whereby alternating movement of the platen actuates said alternating driver.

14. A printing press having, in combination: an alternating platen; a fixed member; a stock-retainer movably mounted on the platen; a rotary control member mounted on the platen; operatively connecting means between said control member and said stock-retainer whereby the control member moves the stock-retainer through a cycle of printing positions, said means being adjustable to determine said printing positions; and means associated with the rotary control member and said fixed member whereby the control member is actuated by alternations of the platen in timed sequence with the printing movements of the press.

15. A printing press having, in combination: an alternating platen; a fixed member; a stock-retainer movably mounted on the platen; means associated with the platen and the fixed member operated by movements of the platen relative to the fixed member to intermittently shift stock across the platen in one direction through a succession of printing positions in timed sequence with the printing movements of the press; and yielding means to reverse the movement of the stock-retainer from the last printing position to the first printing position in timed sequence with the impression movements of the press.

16. A printing press having, in combination: an alternating platen; a fixed member; a normally closed stock-retainer movably mounted on the platen; means associated with the platen and the fixed member operated by movements of the platen relative to the fixed member to intermittently shift stock across the platen in one direction through a succession of printing positions in timed sequence with the printing movements of the press; yielding means to reverse the moveing position to the first printing position in timed sequence with the impression movements of the press; and means on the platen cooperating with the stock-retainer to open the stock-retainer at one of said printing positions for removal and feeding of stock, said stock-retainer being closed at all other printing positions.

17. A platen construction adapted for incorporation in a finished standard printing press having an alternating platen to add thereto the function of automatic repetitive printing on each sheet of stock, such construction comprising: a platen suitable for substitution in the printing press; a stock-retainer movably mounted on the platen; mechanism mounted on the platen for intermittently shifting the stock-retainer across the platen through a sequence of printing positions; and a connecting member joined at one end to said mechanism and adapted at the other end for joining to the press whereby said mechanism may be actuated by relative movements of the platen in timed sequence with the printing movements of the press.

18. A platen construction adapted for incorporation in a finished standard printing press having an alternating platen to add thereto the function of automatic repetitive printing on each sheet of stock, said construction comprising: a platen suitable for substitution in the printing press; a stock-retainer movably mounted on the platen; mechanism mounted on the platen for intermittently shifting the stock-retainer across the platen through a sequence of printing positions; and a flexible connecting member joined at one end to the mechanism and adapted to be anchored at the other end to a fixed part of the press whereby said mechanism may be actuated by movements of the platen in timed sequence with the printing movements of the printing press.

19. A platen construction adapted for incorporation in a finished standard printing press having an alternating platen to add thereto the function of automatic repetitive printing on each sheet of stock, said construction comprising: a platen suitable for substitution in the printing press; a normally closed stock-retainer movably mounted on the platen; adjustable mechanism mounted on the platen for intermittently shifting the stock-retainer across the platen through a cycle of printing positions in one direction and to reverse the cycle in one movement; a connecting member joined at one end to said mechanism and adapted at the other end for joining to the press whereby said mechanism may be actuated by relative movements of the platen in timed sequence with the printing movements of the press; and means on the platen cooperative with the stock-retainer to open the stock-retainer temporarily at one of said printing positions, the stock-retainer being closed at all other positions.

20. A platen construction adapted for incorporation in a finished standard printing press having an alternating platen to add thereto the function of automatic repetitive printing on each sheet of stock, said construction comprising: a platen suitable for substitution in the printing press; a normally closed stock-retainer movably mounted on the platen; mechanism mounted on the platen for intermittently shifting the stock-retainer across the platen through a cycle of printing positions in one direction and to reverse the cycle in one movement; a flexible connecting member joined at one end to the mechanism and adapted to be anchored at the other end to a fixed part of the press whereby said mechanism may be actuated by movements of the platen in timed sequence with the printing movements of the printing press; and means on the platen cooperative with the stock-retainer to open the stock-retainer temporarily at one of said printing positions, the stock-retainer being closed at all other positions.

21. The combination with a printing press having a platen and a member having a primary function apart from the platen, there being relative movement between the platen and said member, of means to provide automatic repetitive printing on a sheet of stock, said means comprising: a stock-retainer movably mounted on the platen; mechanism on the platen to shift the stock-retainer across the platen through a cycle of printing positions; and means interconnecting said mechanism and said press member whereby the mechanism is actuated by said relative movement between the platen and the press member.

22. The combination with a printing press having a platen and a member having a primary function apart from the platen, there being relative movement between the platen and said member, of means to provide automatic repetitive printing on a sheet of stock, said means comprising: a normally closed stock-retainer movably mounted on the platen; mechanism on the platen to shift the stock-retainer across the platen from a first printing position through a cycle of printing positions back to the first printing position; means interconnecting the mechanism and said press member whereby the mechanism is actuated by said relative movement between the platen and the press member; and means on the platen to open the stock-retainer at the first printing position for removal and feeding of stock, said stock-retainer being closed at the other printing positions.

AUGUST B. PLUSHKELL.